Figure 1:
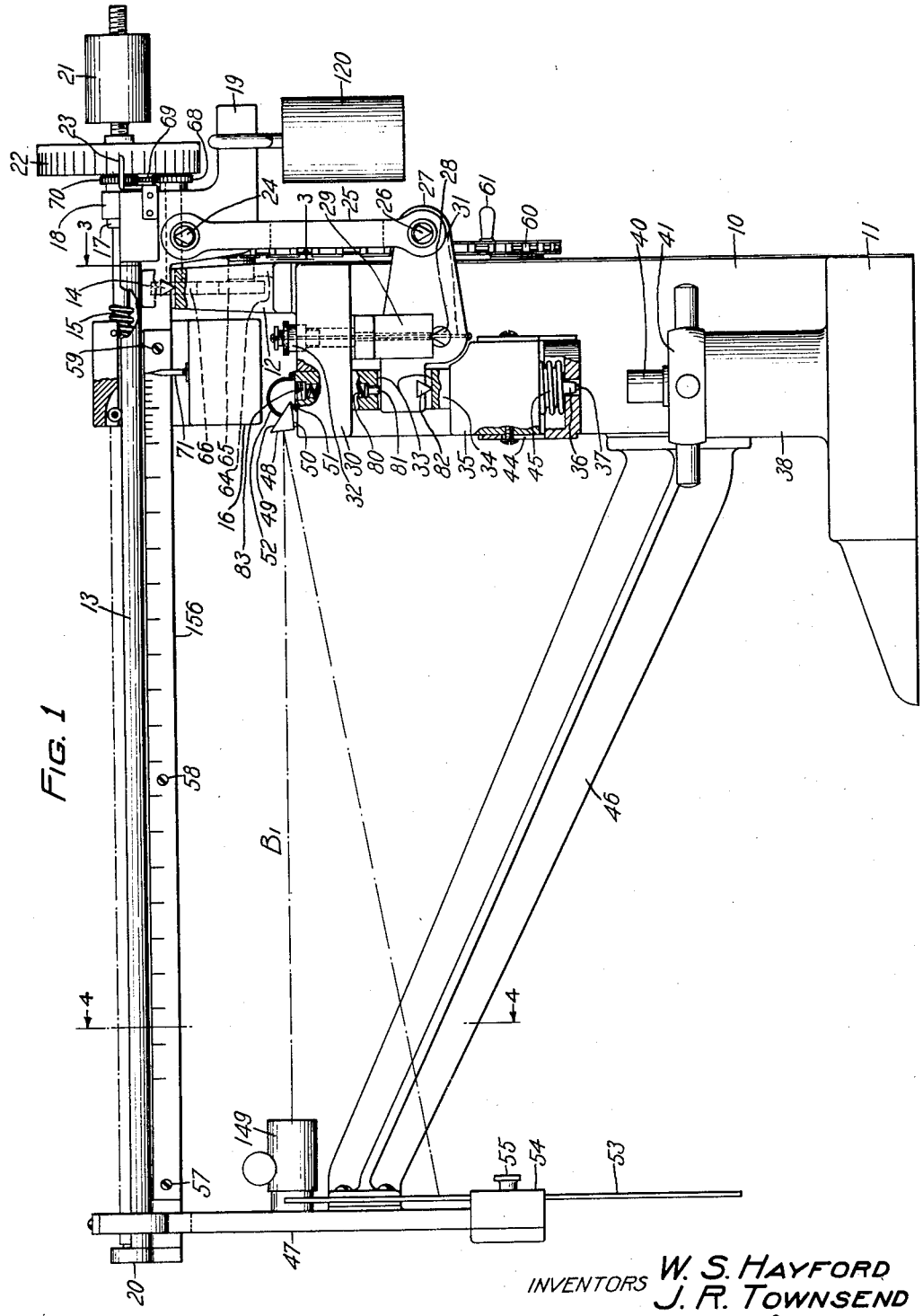

Nov. 28, 1933.  W. S. HAYFORD ET AL  1,937,115

TESTING MACHINE

Filed Sept. 16, 1929   2 Sheets-Sheet 1

INVENTORS W. S. HAYFORD
J. R. TOWNSEND
BY J. Mac Donald
ATTORNEY

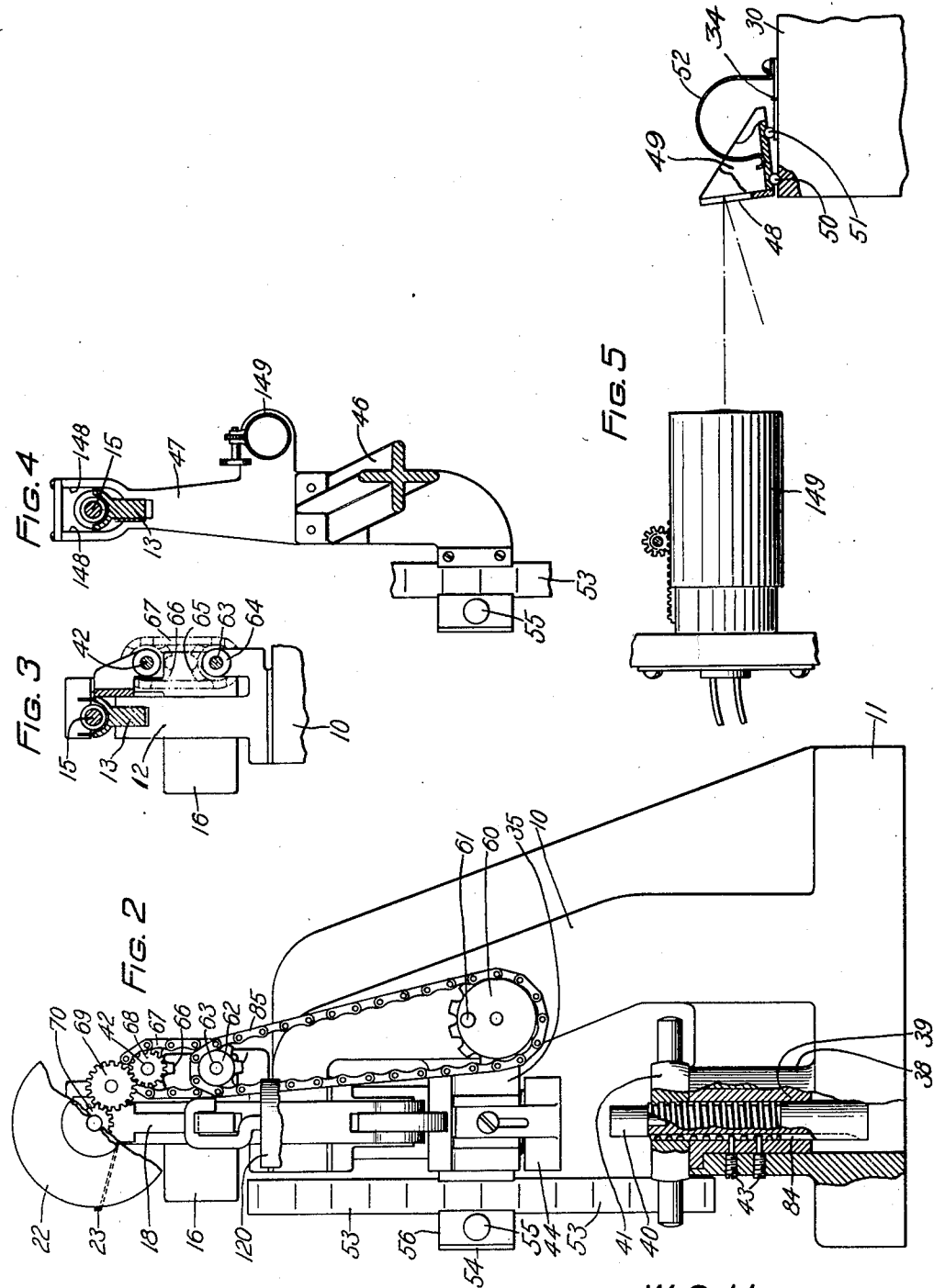

UNITED STATES PATENT OFFICE 1,937,115

TESTING MACHINE

Walter S. Hayford, Morristown, and John R. Townsend, Bloomfield, N. J., assignors to Bell Telephone Laboratories, Incorporated, New York, N. Y., a corporation of New York Application September 16, 1929
Serial No. 392,973

2 Claims. (Cl. 265—16)

This invention relates to testing machines of the type used for testing the hardness of sheet metal and other materials.

The object of the invention is to provide a machine of this character which will give a direct indication of each measurement, wherein the time for effecting such measurement is greatly reduced, and in which the hardness measurement of material is effected with increased accuracy.

In the hardness testing machine of this invention, the material to be tested is subjected to pressure between a support or anvil and a plunger. This plunger is provided with a ball of a suitable diameter for causing an indentation in the material, the load applied to the plunger to produce a predetermined penetration in the material being an indication of the hardness of the material. An optical system is provided for projecting a beam of light onto a scale through the movement of a mirror which is actuated by the plunger for readily indicating the depth of the penetration of the ball in the material. A scale beam and a jockey weight movable therealong through the operation of a screw, disposed in parallel relation to the beam, constitute the pressure applying means, the movement of the beam being transmitted to the plunger through a link bar and a lever fulcrumed on knife edge pivots. The load applied on the plunger is readily indicated by the position of the weight on the scale beam.

In the drawings, Fig. 1 is a front elevation of the machine, Fig. 2 is an end view thereof, Fig. 3 is a sectional view taken approximately on line 3—3 of Fig. 1, Fig. 4 is a sectional view taken approximately on line 4—4 of Fig. 1, and Fig. 5 is a view showing a light projector and a mirror of an optical system used in this machine.

The hardness testing machine of this invention consists of an upright supporting frame 10, having a base 11. On the top of frame 10 there is mounted a steel support or seat 12 shown in Fig. 1, on which a scale beam 13 is fulcrumed on a prism or knife edge pivot 14. Adjacent to, and in line parallel to the beam 13 there is rotatably mounted a lead screw 15 which threadedly engages a weight 16 slidably mounted on the beam 13. Screw 15 is journalled at one end in a bushing 17 which is mounted in a headpiece 18 carried by the beam 13 and the other end of this screw is journalled on a plate 20 mounted on the free end of beam 13.

The headpiece 18 is formed integrally with an arm 19 which supports a counter weight 120 which cooperates with an adjustable counterweight 21 mounted on an extension of screw 15 for accurately balancing the scale beam 13. Securely mounted on screw 15 there is provided a drum dial 22 which cooperates with a pointer 23 mounted on the headpiece 18 to serve as a micrometer adjustment for the weight 16.

The headpiece 18 carries a knife edge pivot 24 which is engaged by a link 25. The other end of this link engages a knife edge pivot 26 carried at one end of a double armed lever 27 which is in turn pivoted on a knife edge pivot 28 resting against a support 29 secured to the under surface of a laterally extending lug 30 of support 10. The arm 27 is held in adjusted position on the under surface of support 29 by a spring wire 31 shown in Fig. 1. This wire threads through the lever 27, through the support 29, the lug 30 of support 10 and through an adjustable bushing 32 to which the upper end of the wire 31 is secured. The shorter arm of lever member 27 passes through a slot 33 across a plunger 34 which is slidably mounted in lugs 30 and 35 each extending laterally and in parallel relation from upright support 10. The top end of plunger 34 is drilled to receive a spring 80 acting on a plunger 81 for resiliently holding the knife edge pivot 82 of lever 27 against the plunger 34 and a threaded plug 83 is provided for adjusting the tension of spring 80. The lower end of plunger 34 has a reduced portion 36 which is centrally drilled to receive a steel ball 37 provided for causing indentation in the material under test in a manner that will be hereinafter described in detail.

Integrally formed with the base 11 and extending upwardly in a coaxial alignment with plunger 34 there is provided a hub portion 38 in which is fixedly mounted a sleeve 39 shown in Fig. 2, provided for guiding a plunger or anvil 40. This plunger is screw threaded and engages a similarly screw threaded hand wheel 41 for raising or lowering the plunger 41 for accommodating samples of different thicknesses between the ball 37 and the top end of anvil 40. A number of screws such as 43 fit into a key-way 84 to prevent the rotation of the plunger against the frictional resistance of hand wheel 41.

On the lug 35 of support 10 there is slidably mounted a cup shaped member 44 which is held in a detent position as shown in Fig. 1 by a spring 45 abutting against the underside of lug 35 and the inner side of the cup member 44. This member cooperates with anvil 40 to permit the clamping of the material under test previous to the application of the load as will be hereinafter described in detail.

On lug 30 is pivotally mounted a frame 49 which supports a mirror 48. The base of frame 49 at one end rests on the roller 50 carried by lug 30 and the other end on a roller 51 carried by plunger 34, the frame being held in adjusted position on the rollers 50 and 51 by a leaf spring 52 secured at one end on plunger 34.

On the support 10 there is securely mounted a bracket 46 which extends in the direction of the scale beam 13 and on the free end of this bracket there is mounted a plate 47 having a forked portion 148 for guiding the end of scale beam 13. This plate supports a light projecting device 149 shown in Figs. 4 and 5 arranged to project a beam of light B1 against the mirror 48 from which the light beam is reflected against a vertically disposed scale 53 mounted on plate 47. Scale 53 is slidably mounted in a guiding member 54 and is held in adjusted position thereon by a thumb screw 55 bearing on a clamping plate 56.

The scale beam 13 is provided with a graduated scale 156 which is held on the beam by a number of screws 57, 58 and 59. The weight 16 may be moved along the scale beam 13 by a driving mechanism shown in Figs. 1 and 2. In this mechanism a sprocket wheel 60 having a handle 61 is rotatably mounted on support 10 and imparts movement to a sprocket wheel 62 keyed on one end of a counter shaft 63 by a chain 85. Counter shaft 63 is rotatably mounted in bearing 64 shown in Fig. 3 and on the other end of this shaft is mounted another sprocket wheel 65 which is operatively connected to a sprocket wheel 66 by a chain 67. Sprocket wheel 66 is keyed on one end of a spindle 42 which carries at its other end a spur gear 68 which meshes with gear 69 in turn in mesh with gear 70 keyed on the screw 13.

The operation of this machine is as follows: With the jockey weight 16 and the pointer 71 carried thereby registering with the first mark on the scale beam and the counter-weight 120 in position as shown in Fig. 1, counter-weight 21 is moved in adjusted position on the extension of screw 15 for accurately balancing the scale beam 13. This adjustment is indicated by the beam of light projected onto the scale 53 by the optical system which includes the light projector 149 and mirror 48. The sample of material to be tested is then placed on anvil 40 which is raised by turning the hand wheel 41 in position wherein the sample of material is yieldably held between the anvil 40 and the spring pressed member 44. The raising of the anvil 40 is continued until the sample of material touches the ball 37 at the end of plunger 34. The weight 16 is then moved along the scale beam 13 through the manual operation of its driving mechanism which as above described includes the manually operable sprocket wheels 60, 62, chain 85, sprocket wheels 65, 66 and chain 67 and the gears 68, 69 and 70. The displacement of weight 16 toward the end of the beam causes an increase of pressure on the plunger 34 which in turn forces the ball into the material under test for causing an indentation therein. The movement of the plunger 34 causes the pivotal movement of mirror 48 which indicates the depth of the indentation through the projection of the light beam on the scale 53. The weight required to cause such indentation is an indication of the hardness of the material, and this weight is readily indicated by the position of the weight on the beam scale.

What is claimed is:

1. In a hardness testing machine, a plunger, a mechanism for applying pressure to said plunger comprising a beam and a weight movable along said beam, a guiding member for said plunger, an optical system, said system including a light projector, a scale placed adjacent to said projector, a mirror pivoted on said member and having a portion engaging said plunger for reflecting the light from said projector onto said scale for indicating the extent of movement of said plunger, and a scale on said beam for indicating the pressure applied on said plunger.

2. In a hardness testing machine, a frame, a beam pivotally mounted on said frame, an adjustable counter-weight for balancing said beam, a screw carried by said beam, a weight threadedly engaging said screw, means operatively connecting said beam to said plunger, a guide for said plunger, an anvil mounted on said frame, a device mounted on said guide for yieldably holding the material under test on said anvil, a combined chain and gear driving mechanism for rotating said screw to effect a change in weight on said plunger corresponding to the movement of said weight on said beam for causing an indentation in the material, a scale, and means responsive to the movement of said plunger cooperating with said scale for indicating the depth of the indentation in the material.

WALTER S. HAYFORD.
JOHN R. TOWNSEND.